United States Patent
Shin et al.

(10) Patent No.: US 9,297,940 B2
(45) Date of Patent: Mar. 29, 2016

(54) PHOTOSENSITIVE RESIN COMPOSITION AND COLOR FILTER PREPARED USING THE SAME

(71) Applicant: Cheil Industries Inc., Gumi-si (KR)

(72) Inventors: Myoung Youp Shin, Uiwang-si (KR); Won Jung Kim, Uiwang-si (KR); Hwan Sung Cheon, Uiwang-si (KR); Eui Soo Jeong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/307,600

(22) Filed: Jun. 18, 2014

(65) Prior Publication Data

US 2015/0028271 A1    Jan. 29, 2015

(30) Foreign Application Priority Data

Jul. 24, 2013 (KR) .................. 10-2013-0087667

(51) Int. Cl.
*G02B 5/23* (2006.01)
*C09B 23/04* (2006.01)
*G02F 1/1335* (2006.01)
*G03F 1/00* (2012.01)
*G03C 1/00* (2006.01)

(52) U.S. Cl.
CPC .. *G02B 5/23* (2013.01); *C09B 23/04* (2013.01)

(58) Field of Classification Search
USPC ....... 252/582, 586; 257/432; 359/891; 430/7, 430/270.1, 285.1, 286.1, 434, 281.1; 546/193, 280.4; 552/101; 349/106; 427/162, 514; 522/111
See application file for complete search history.

(56) References Cited

U.S. PATENT DOCUMENTS

| 5,580,980 | A | * | 12/1996 | Etzbach et al. ............. 544/105 |
| 5,811,209 | A |   | 9/1998  | Eida et al. |
| 2008/0020300 | A1 | * | 1/2008 | Lee et al. ............. 430/7 |
| 2010/0140559 | A1 |   | 6/2010 | Klaus et al. |
| 2010/0160474 | A1 |   | 6/2010 | Lee et al. |

FOREIGN PATENT DOCUMENTS

| KR | 1996-0011513 B1 | 4/1996 |
| TW | 200916955 A | 4/2009 |

OTHER PUBLICATIONS

Office Action in counterpart Taiwanese Application No. 103121916 dated Apr. 8, 2015, pp. 1-5.

* cited by examiner

*Primary Examiner* — Bijan Ahvazi

(74) *Attorney, Agent, or Firm* — Additon, Higgins & Pendleton, P.A.

(57) ABSTRACT

The present invention relates to a compound represented by Formula 1, wherein in Formula 1, each of $R_1$ to $R_7$ is the same as defined in the specification, a photosensitive resin composition comprising the same, and a color filter prepared using the same. The color filter can realize high contrast and high brightness.

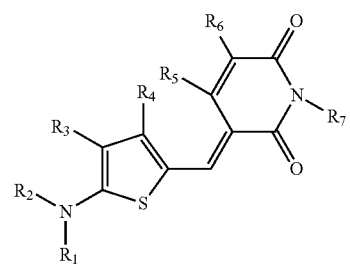

[Formula 1]

15 Claims, No Drawings

PHOTOSENSITIVE RESIN COMPOSITION AND COLOR FILTER PREPARED USING THE SAME

CROSS-REFERENCE TO RELATED APPLICATION

This application claims priority under 35 USC Section 119 to and the benefit of Korean Patent Application No. 10-2013-0087667, filed Jul. 24, 2013, the entire disclosure of which is incorporated herein by reference.

FIELD OF THE INVENTION

The present invention relates to a photosensitive resin composition and a color filter prepared using the same.

BACKGROUND

Color filters are generally used in liquid crystal displays (LCDs), optical filters of cameras, and the like, and are prepared by coating a minute area colored with three or more colors onto a charge coupled device or a transparent substrate. Such colored thin films are typically formed by dyeing, printing, electrodeposition, pigment dispersion, inkjet printing, and the like. Currently, such methods are used in the production of LCDs of various electronic devices, such as mobile phones, notebook computers, monitors, TVs, and the like.

In the dyeing method, a colored thin film can be produced by forming an image using a dyeing matrix, such as natural photosensitive resins including gelatin, amine modified polyvinyl alcohols, amine modified acrylic binder resins, and the like, on a glass substrate, followed by dyeing with direct dyes. In order to form a multi-colored thin film on the same substrate, it is necessary to perform flame retardant finishing whenever the color changes, thereby complicating the production process and delaying production time. Although general dyes and resins per se can have good clarity and dispersibility, these dyes and resins have drawbacks in that they can have poor light resistance, moisture resistance, and heat resistance.

In the printing method, a colored thin film can be prepared by printing an ink wherein a pigment is dispersed in a thermosetting or photocurable resin, followed by curing these components with heat or light. This method can reduce material costs as compared to other methods. However, the method has drawbacks in that it can be difficult to form a highly defined and minute image, and the formed thin layers may not be uniform.

Korean Patent Publication No. 1996-0011513 discloses a method of preparing a color filter by inkjet printing. However, this method can result in deteriorated durability and heat resistance as in the dyeing method since a colored photosensitive resin composition to be injected from a nozzle to print a minute and defined color is prepared in dye form.

In the pigment dispersion method, a colored thin film can be produced by repeating a series of steps including coating a photopolymerizable composition containing a colorant on a transparent substrate to which a black matrix is provided, exposing the composition to light in a desired pattern, removing the unexposed portion with a solvent, and heat curing. The pigment dispersion method can enhance heat resistance and durability, which are important properties of color filters, and can ensure a uniform film thickness.

As pigments for color filters in the pigment dispersion method, C.I. Pigment Green, C.I. Pigment Yellow, C.I. Pigment Blue, C.I. Pigment Violet, and the like essentially consisting of phthalocyanine pigments can be used in combination. However, in this case, atomization of the pigments can limit brightness and contrast due to pigment particle size. As a method for additionally improving color properties, it may be necessary to introduce a highly durable dye having no granular property in a molten state or a very small primary particle diameter of not more than several nanometers.

In general, although various studies have been made regarding color filters to which many dyes can be introduced, it is difficult to provide both excellent light transmission and excellent absorption capabilities in a desired color range. Further, dyes satisfying high contrast together with basic reliability for use in color filters are very rare.

SUMMARY

Exemplary embodiments of the present invention relate to a compound represented by Formula 1:

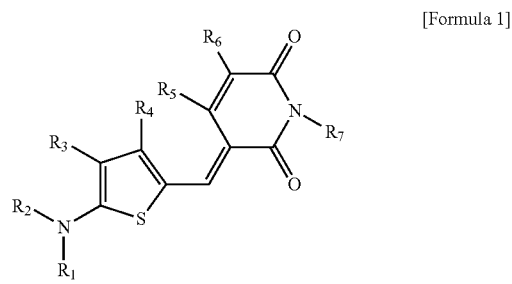

[Formula 1]

wherein $R_1$ and $R_2$ are the same or different and are each independently hydrogen or substituted or unsubstituted $C_1$ to $C_{10}$ alkyl; $R_3$ and $R_4$ are the same or different and are each independently hydrogen, halogen, or substituted or unsubstituted $C_1$ to $C_3$ alkyl; $R_5$ and $R_6$ are the same or different and are each independently hydrogen, a cyano group, or substituted or unsubstituted $C_1$ to $C_3$ alkyl; and $R_7$ is hydrogen or substituted or unsubstituted $C_1$ to $C_m$ alkyl, provided that at least one of $R_3$ and $R_4$ is halogen.

The halogen may be —F, —Cl, —Br, or —I.

Other exemplary embodiments of the present invention relate to a photosensitive resin composition including: a colorant including the compound represented by Formula 1; an acrylic binder resin; a photopolymerizable compound; a photoinitiator; and a solvent.

The photosensitive resin composition may include about 1 percent by weight (wt %) to about 30 wt % of the colorant; about 1 wt % to about 20 wt % of the acrylic binder resin; about 1 wt % to about 20 wt % of the photopolymerizable compound; about 0.1 wt % to about 5 wt % of the photoinitiator; and the balance of the solvent.

The colorant may further include at least one pigment selected from among a red pigment and/or a yellow pigment.

The colorant may include the compound represented by Formula 1 and the pigment in a weight ratio of about 9:1 to about 1:9.

The acrylic binder resin may be a copolymer of a first ethylenic unsaturated monomer having at least one carboxylic group, and a second ethylenic unsaturated monomer copolymerizable with the first ethylenic unsaturated monomer.

The photopolymerizable compound may include one or more of ethylene glycol diacrylate, triethylene glycol diacrylate, 1,4-butanediol diacrylate, 1,6-hexanediol diacrylate, neopentyl glycol diacrylate, pentaerythritol diacrylate, pentaerythritol triacrylate, dipentaerythritol diacrylate, dipentaerythritol triacrylate, dipentaerythritol pentaacrylate, pentaerythritol hexaacrylate, bisphenol A diacrylate, trimethylol propane triacrylate, novolac epoxy acrylate, ethylene glycol dimethacrylate, diethylene glycol dimethacrylate, triethylene glycol dimethacrylate, propylene glycol dimethacrylate, 1,4-butanediol dimethacrylate, and/or 1,6-hexanediol dimethacrylate.

The photoinitiator may include one or more of triazine compounds, acetophenone compounds, benzophenone compounds, thioxanthone compounds, benzoin compounds, and/or oxime compounds.

The photosensitive resin composition may further include one or more additives of dispersants, coating improvers, adhesion promoters, silane coupling agents, leveling agents, surfactants, and/or polymerization initiators.

Further embodiments of the present invention relate to a color filter including the compound represented by Formula 1.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A photosensitive resin composition for color filters according to one embodiment of the invention includes: (A) a colorant including a compound represented by the following Formula 1; (B) an acrylic binder resin; (C) a photopolymerizable compound; (D) a photoinitiator; and (E) a solvent.

Hereinafter, each component of the photosensitive resin composition of the embodiment of the invention will be described in detail.

(A) Colorant

The colorant according to the present invention may include a compound represented by Formula 1:

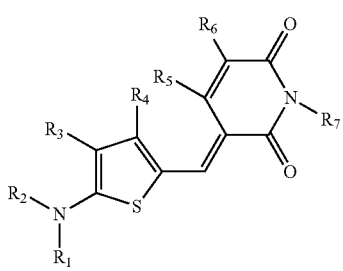

[Formula 1]

wherein $R_1$ and $R_2$ are the same or different and are each independently hydrogen or substituted or unsubstituted $C_1$ to $C_{10}$ alkyl; $R_3$ and $R_4$ are the same or different and are each independently hydrogen, halogen, or substituted or unsubstituted $C_1$ to $C_3$ alkyl; $R_5$ and $R_6$ are the same or different and are each independently hydrogen, a cyano group, or substituted or unsubstituted $C_1$ to $C_3$ alkyl; and $R_7$ is hydrogen or substituted or unsubstituted $C_1$ to $C_{10}$ alkyl, provided that at least one of $R_3$ and $R_4$ is halogen.

As used herein, the term "substituted" means that a hydrogen atom of a compound is substituted with a substituent such as halogen (F, Cl, Br and I), hydroxyl, nitro, cyano, amino, azido, amidino, hydrazine, hydrazono, carbonyl, carbamyl, thiol, ester, carboxyl or a salt thereof, sulfonic acid or a salt thereof, phosphoric acid or a salt thereof, $C_1$ to $C_{20}$ alkyl, $C_2$ to $C_{20}$ alkenyl, $C_2$ to $C_{20}$ alkynyl, $C_1$ to $C_{20}$ alkoxy, $C_6$ to $C_{30}$ aryl, $C_6$ to $C_{30}$ aryloxy, $C_3$ to $C_{30}$ cycloalkyl, $C_3$ to $C_{30}$ cycloalkenyl, $C_3$ to $C_{30}$ cycloalkynyl, or a combination thereof.

In $R_1$ and $R_2$, the alkyl may be linear and/or branched $C_1$ to $C_{10}$ alkyl, or may form a $C_3$ to $C_6$ cyclic compound.

At least one of $R_3$ and $R_4$ may be —F, —Cl, —Br, or —I.

In one embodiment, $R_1$ and $R_2$ may be a butyl group or a hexyl group, $R_3$ may be bromine, $R_4$ and $R_5$ may be hydrogen, $R_6$ may be a cyano group, and $R_7$ may be a butyl group or a hexyl group.

In another embodiment, $R_1$ and $R_2$ may form a cyclohexyl group, $R_3$ may be a bromine group, $R_4$ and $R_5$ may be hydrogen, $R_6$ may be a cyano group, and $R_7$ may be a butyl group or a hexyl group.

The colorant may further include at least one pigment selected from among red pigments and/or yellow pigments in addition to the compound represented by Formula 1.

Examples of the red pigment may include without limitation C.I. Pigment Red 254, C.I. Pigment Red 255, C.I. Pigment Red 264, C.I. Pigment Red 270, C.I. Pigment Red 272, C.I. Pigment Red 177, C.I. Pigment Red 89, and the like, and combinations thereof.

Examples of the yellow pigment may include without limitation isoindoline pigments, such as C.I. Pigment Yellow 139 and the like, quinophthalone pigments, such as C.I. Pigment Yellow 138, and the like, nickel complex pigments, such as C.I. Pigment Yellow 150, and the like, and combinations thereof.

The pigment may be used together with dispersants so as to be sufficiently dispersed in the photosensitive resin composition.

For example, the pigment may be subjected to surface pretreatment with dispersants, or a pigment dispersion including the pigment together with dispersants may be added upon preparation of the photosensitive resin composition.

As the dispersants, nonionic dispersants, anionic dispersants, and/or cationic dispersants, and the like may be used. Examples of the dispersants may include without limitation polyalkylene glycol and esters thereof, polyoxyalkylenes, polyhydric alcohol ester alkylene oxide adducts, alcohol alkylene oxide adducts, sulfonic acid esters, sulfonic acid salts, carboxylic acid esters, carboxylic acid salts, alkylamide alkylene oxide adducts, alkyl amines, and the like. These may be used alone or in combination of two or more thereof.

When the colorant includes the pigment in addition to the compound represented by Formula 1, the compound represented by Formula 1 and the pigment may be present in a weight ratio of about 9:1 to about 1:9, for example about 3:7 to about 7:3.

The photosensitive resin composition may include the colorant (A) in an amount of about 1 wt % to about 30 wt %, for example about 5 wt % to about 25 wt %, based on the total amount (total weight, 100 wt %) of the photosensitive resin composition. In some embodiments, the photosensitive resin composition may include the colorant (A) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the colorant (A) can be in a range from about any of the foregoing amounts to about any other of the foregoing amounts.

When the photosensitive resin composition includes the colorant in an amount within this range, the photosensitive resin composition can exhibit high contrast and high brightness at desired color coordinates.

(B) Acrylic Binder Resin

The acrylic binder resin is a copolymer of a first ethylenic unsaturated monomer and a second ethylenic unsaturated monomer copolymerizable therewith, and includes at least one acrylic repeat unit.

The first ethylenic unsaturated monomer may include at least one carboxyl group. Examples of the first ethylenic unsaturated monomer can include without limitation acrylic acid, methacrylic acid, maleic acid, itaconic acid, fumaric acid, and the like, and combinations thereof.

The first ethylenic unsaturated monomer can be present in an amount of about 5 wt % to about 50 wt %, for example about 10 wt % to about 40 wt %, based on the total weight (100 wt %) of the acrylic binder resin.

Examples of the second ethylenic unsaturated monomer may include without limitation alkenyl aromatic monomers, unsaturated carboxylic acid ester compounds, unsaturated carboxylic acid amino alkyl ester compounds, carboxylic acid vinyl ester compounds, unsaturated carboxylic acid glycidyl ester compounds, vinyl cyanide compounds, unsaturated amide compounds, and the like, and combinations thereof.

Representative examples of the alkenyl aromatic monomer may include without limitation styrene, α-methyl styrene, vinyl toluene, vinyl benzyl methyl ether, and the like; representative examples of the unsaturated carboxylic acid ester compound may include without limitation methyl acrylate, methyl methacrylate, ethyl acrylate, ethyl methacrylate, butyl acrylate, butyl methacrylate, 2-hydroxy ethyl acrylate, 2-hydroxy ethyl methacrylate, 2-hydroxy butyl acrylate, 2-hydroxy butyl methacrylate, benzyl acrylate, benzyl methacrylate, cyclohexyl acrylate, cyclohexyl methacrylate, phenyl acrylate, phenyl methacrylate, and the like; representative examples of the unsaturated carboxylic acid amino alkyl ester compound may include without limitation 2-amino ethyl acrylate, 2-amino ethyl methacrylate, 2-dimethyl amino ethyl acrylate, 2-dimethyl amino ethyl methacrylate, and the like; representative examples of the carboxylic acid vinyl ester compounds may include without limitation vinyl acetate, vinyl benzoate, and the like; representative examples of the unsaturated carboxylic acid glycidyl ester compounds may include without limitation glycidyl acrylate, glycidyl methacrylate, and the like; representative examples of the vinyl cyanide compounds may include without limitation acrylonitrile, methacrylonitrile, and the like; and representative examples of the unsaturated amide compounds may include without limitation acrylamide, methacrylamide, and the like, without being limited thereto. Such a second ethylenic unsaturated monomer may be used alone or in combination of two or more thereof.

Examples of the acrylic binder resin including the first ethylenic unsaturated monomer and the second ethylenic unsaturated monomer may include without limitation methacrylic acid/benzyl methacrylate copolymers, methacrylic acid/benzyl methacrylate/styrene copolymers, methacrylic acid/benzyl methacrylate/2-hydroxy ethyl methacrylate copolymers, and methacrylic acid/benzyl methacrylate/styrene/2-hydroxy ethyl methacrylate copolymers, without being limited thereto. These compounds may be used alone or in combination of two or more thereof.

The acrylic binder resin may have a weight average molecular weight (Mw) ranging from about 3,000 g/mol to about 150,000 g/mol, for example from about 5,000 g/mol to about 50,000 g/mol. When the weight average molecular weight of the acrylic binder resin is within this range, the composition can exhibit excellent adhesion to the substrate, excellent physical and chemical properties, suitable viscosity, and excellent dispersibility.

The acrylic binder resin is the most influential factor to pixel resolution of the photosensitive resin composition. For example, the methacrylic acid/benzyl methacrylate copolymer can significantly affect pixel resolution due to the acid value and weight average molecular weight thereof. For example, when the copolymer has a weight ratio of methacrylic acid/benzyl methacrylate of 25/75 (w/w), an acid value of about 15 mgKOH/to about 120 mgKOH/g, and a weight average molecular weight of about 3,000 g/mol to about 150,000 g/mol, it is possible to achieve excellent pixel resolution.

The photosensitive resin composition may include the acrylic binder resin in an amount of about 1 wt % to about 20 wt %, based on the total amount (total weight, 100 wt %) of the photosensitive resin composition. In some embodiments, the photosensitive resin composition may include the acrylic binder resin in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the acrylic binder resin can be in a range from about any of the foregoing amounts to about any other of the foregoing amounts.

When the photosensitive resin composition includes the acrylic binder resin in an amount from about 1 wt % to about 20 wt %, the composition can exhibit excellent adhesion to the substrate, ensure a uniform film thickness, and provide excellent post-process properties to the color filter, such as film strength, heat resistance, chemical resistance, afterimage, and the like. Further, the composition can have excellent surface smoothness due to suitable cross-linking.

(C) Photopolymerizable Compound

The photopolymerizable compound may be selected from among photopolymerizable monomers, oligomers thereof and combinations thereof.

Examples of the photopolymerizable monomer may include without limitation ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, neopentyl glycol di(meth)acrylate, pentaerythritol di(meth) acrylate, pentaerythritol tri(meth)acrylate, pentaerythritol tetra(meth)acrylate, pentaerythritol penta(meth)acrylate, pentaerythritol hexa(meth)acrylate, dipentaerythritol di(meth)acrylate, dipentaerythritol tri(meth)acrylate, dipentaerythritol tetra(meth)acrylate, dipentaerythritol penta (meth)acrylate, dipentaerythritol hexa(meth)acrylate, bisphenol A di(meth)acrylate, propane tri(meth)acrylate, novolac epoxy(meth)acrylate, dipentaerythritol penta(meth) acrylate derivatives having a carboxyl group, ethylene oxidized glycerine trimethylol propane tri(meth)acrylate, propylene oxidized glycerine tri(meth)acrylate, and the like, and combinations thereof.

Examples of the photopolymerizable oligomer may include without limitation epoxy(meth)acrylate, urethane (meth)acrylate, polyester(meth)acrylate, and the like, and combinations thereof.

Since the photopolymerizable monomer and/or oligomer tends to enhance solvent resistance through reaction with cyclic ether, it is advantageous for the photopolymerizable monomer and/or oligomer to include a carboxyl group. Examples of the photopolymerizable monomer and/or oligomer having a carboxyl group may include an ester of a hydroxyl group-containing (meth)acrylate and a polyvalent carboxylic acid, an ester of a hydroxyl group-containing (meth)acrylate and a polyvalent carboxylic anhydride, and the like, and combinations thereof.

Examples of the hydroxyl group-containing (meth)acrylate may include without limitation trimethylol propane di(meth)acrylate, glycerine di(meth)acrylate, pentaerythritol tri(meth)acrylate, dipentaerythritol penta(meth)acrylate, and the like, and combinations thereof.

Examples of the polyvalent carboxylic acid may include without limitation aromatic polyvalent carboxylic acids, such as phthalic acid, 3,4-dimethylphthalic acid, isophthalic acid, terephthalic acid, pyromellitic acid, trimellitic acid, 1,4,5,8-naphthalene tetracarboxylic acid, 3,3',4,4'-benzophenone tetracarboxylic acid, and the like; aliphatic polyvalent carboxylic acids, such as succinic acid, glutaric acid, adipic acid, 1,2,3,4-butanetetracarboxylic acid, maleic acid, fumaric acid, itaconic acid, and the like; alicyclic polyvalent carboxylic acids, such as hexahydrophthalic acid, 3,4-dimethyltetrahydrophthalic acid, hexahydroisophthalic acid, hexahydroterephthalic acid, 1,2,4-cyclopentane tricarboxylic acid, 1,2,4-cyclohexanetricarboxylic acid, cyclopentanetetracarboxylic acid, 1,2,4,5-cyclohexane, tetracarboxylic acid, and the like, and combinations thereof.

Examples of the polyvalent carboxylic anhydride may include without limitation aromatic polyvalent carboxylic anhydrides, such as phthalic anhydride, pyromellitic anhydride, trimellitic anhydride, 3,3',4,4'-benzophenone tetracarboxylic dianhydride, and the like; aliphatic polyvalent carboxylic anhydrides, such as itaconic anhydride, succinic anhydride, citraconic anhydride, dodecenylsuccinic anhydride, tricarballylic anhydride, maleic anhydride, 1,2,3,4-butanetetracarboxylic dianhydride, and the like; alicyclic polyvalent carboxylic anhydrides, such as hexahydrophthalic anhydride, 3,4-dimethyltetrahydrophthalic anhydride, 1,2,4-cyclopentanetricarboxylic anhydride, 1,2,4-cyclohexanetricarboxylic anhydride, cyclopentanetetracarboxylic dianhydride, 1,2,4,5-cyclohexanetetracarboxylic dianhydride, himic anhydride, nadic anhydride, and the like; ester group-containing carboxylic anhydrides, such as ethylene glycol bistrimellitic anhydride, glycerol tris(trimellitate) anhydride, and the like, and combinations thereof.

Accordingly, examples of the carboxyl group-containing monomers and/or oligomers may include without limitation phthalic acid ester of trimethylol propane di(meth)acrylate, succinic acid ester of glycerine di(meth)acrylate, phthalic acid ester of pentaerythritol tri(meth)acrylate, succinic acid ester of pentaerythritol triacrylate, phthalic acid ester of dipentaerythritol penta(meth)acrylate, succinic acid ester of dipentaerythritol penta(meth)acrylate, and the like, and combinations thereof.

The photosensitive resin composition may include the photopolymerizable compound in an amount of about 1 wt % to about 20 wt %, for example about 3 wt % to about 15 wt %, based on the total weight (total amount, 100 wt %) of the photosensitive resin composition. In some embodiments, the photosensitive resin composition may include the photopolymerizable compound in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the photopolymerizable compound can be in a range from about any of the foregoing amounts to about any other of the foregoing amounts.

When the photosensitive resin composition includes the photopolymerizable compound in an amount within this range, the composition can exhibit sufficient degree of curing, excellent reliability, appropriate viscosity, and excellent stability over time.

(D) Photoinitiator

The photoinitiator can be any photoinitiator generally used in a photosensitive resin composition. Examples of the photoinitiator may include without limitation triazine compounds, acetophenone compounds, biimidazole compounds, benzoin compounds, benzophenone compounds, thioxanthone compounds, oxime compounds, and the like, and combinations thereof.

Examples of the triazine compound may include without limitation 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfurane-2-yl)ethenyl]-1,3,5-triazine, 2,4-bis(trichloromethyl)-6-[2-(furane-2-yl)ethenyl]-1,3,5-triazine, 2,4-bis(trichloromethyl)-6-[2-(4-diethylamino-2-methylphenyl)ethenyl]-1,3,5-triazine, 2,4-bis(trichloromethyl)-6-[2-(3,4-dimethoxyphenyl)ethenyl]-1,3,5-triazine, 2,4-bis(trichloromethyl)-6-piperonyl)-1,3,5-triazine, 2,4,6-trichloro-s-triazine, 2-phenyl-4,6-bis(trichloro methyl)-s-triazine, 2-(3',4'-dimethoxy styryl)-4,6-bis(trichloro methyl)-s-triazine, 2-(4'-methoxy naphthyl)-4,6-bis(trichloro methyl)-s-triazine, 2-(p-methoxy phenyl)-4,6-bis(trichloro methyl)-s-triazine, 2-(p-tolyl)-4,6-bis(trichloromethyl)-s-triazine, 2-biphenyl-4,6-bis(trichloro methyl)-s-triazine, bis (trichloro methyl)-6-styryl-s-triazine, 2-(naphtho 1-yl)-4,6-bis(trichloro methyl)-s-triazine, 2-(4-methoxy naphtho 1-yl)-4,6-bis(trichloro methyl)-s-triazine, 2-4-trichloro methyl (piperonyl)-6-triazine, 2-4-trichloro methyl(4'-methoxy styryl)-6-triazine, and the like, and combinations thereof. In exemplary embodiments, 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine and/or 2,4-bis(trichloromethyl)-6-piperonyl-1,3,5-triazine, for example, 2,4-bis(trichloromethyl)-6-piperonyl-1,3,5-triazine, may be used.

Examples of the acetophenone compound may include without limitation diethoxyacetophenone, 2-methyl-2-morpholino-1-(4-methylthiophenyl)propane-1-one, 2-hydroxy-2-methyl-1-phenylpropane-1-one, benzyldimethylketal, 2-hydroxy-2-methyl-1-[4-(2-hydroxyethoxy)phenyl]propane-1-one, 1-hydroxycyclohexylphenylketone, 2-benzyl-2-dimethylamino-1-(4-morpholinophenyl)butane-1-one, 2-(4-methylbenzyl)-2-dimethylamino-1-(4-morpholinophenyl) butane-1-one, 2-hydroxy-2-methyl-1-[4-(1-methylvinyl) phenyl]propane-1-one, and the like, and combinations thereof. In exemplary embodiments, 2-methyl-2-morpholino-1-(4-methylthiophenyl)propane-1-one, 2-benzyl-2-dimethylamino-1-(4-morpholinophenyl)butane-1-one, and/or 2-(4-methylbenzyl)-2-dimethylamino-1-(4-morpholinophenyl)butane-1-one, for example, 2-benzyl-2-dimethylamino-1-(4-morpholinophenyl)butane-1-one and/or 2-(4-methylbenzyl)-2-dimethylamino-1-(4-morpholinophenyl)butane-1-one, may be used.

Examples of the biimidazole compound may include 2,2'-bis(2-chlorophenyl)-4,4',5,5'-tetraphenylbiimidazole, 2,2'-bis(2-chlorophenyl)-4,4',5,5'-tetra(4-carboethoxyphenyl)biimidazole, 2,2',-bis(2-chlorophenyl)-4,4',5,5'-tetra(4-bromophenyl)biimidazole, 2,2'-bis(2-chlorophenyl)-4,4',5,5'-tetra(2,4-dichlorophenyl)biimidazole, 2,2'-bis(2-bromophenyl)-4,4',5,5'-tetraphenylbiimidazole, 2,2'-bis(2,4-dichlorophenyl)-4,4',5,5'-tetraphenylbiimidazole, 2,2'-bis(2-chlorophenyl)-4,4',5,5'-tetra(m-methoxyphenyl) biimidazole, 2,2'-bis(2,3-dichlorophenyl)-4,4',5,5'-tetraphenylbiimidazole, 2,2'-bis(2,6-dichlorophenyl)-4,4',5,5'-tetraphenylbiimidazole, 2,2'-bis(2-nitrophenyl)-4,4',5,5'- tetraphenylbiimidazole, 2,2'-bis(2-methylphenyl)-4,4',5,5'-tetraphenylbiimidazole, and the like, and combinations thereof. In exemplary embodiments, 2,2'-bis(2-chlorophenyl)-4,4',5,5'-tetraphenylbiimidazole and/or 2,2'-bis(2,3-dichlorophenyl)-4,4',5,5'-tetraphenylbiimidazole may be used.

Examples of the benzoin compound may include without limitation benzoin, benzoin methylether, benzoin ethylether, benzoin isopropylether, benzoin isobutylether, benzyldimethylketal, and the like, and combinations thereof.

Examples of the benzophenone compound may include without limitation benzophenone, benzoyl benzoate, methyl o-benzoyl benzoate, 4-phenyl benzophenone, hydroxy benzophenone, acrylated benzophenone, 3,3'-dimethyl-2-methoxy benzophenone, 4,4'-dichloro benzophenone, 4,4'-bis(dimethylamino)benzophenone, 4,4'-bis(diethylamino)benzophenone, 4-benzoyl-4'-methyldiphenylsulfide, 3,3',4,4'-tetra(tert-butylperoxycarbonyl)benzophenone, 2,4,6-trimethylbenzophenone, and the like, and combinations thereof.

Examples of the thioxanthone compound may include without limitation thioxanthone, 2-methyl thioxanthone, 2-isopropyl thioxanthone, 4-isopropyl thioxanthone, 2,4-diethyl thioxanthone, 2,4-diisopropyl thioxanthone, 2-chlorothioxanthone, 1-chloro-4-propoxythioxanthone, and the like, and combinations thereof.

Examples of the oxime compound may include without limitation O-acyloxime compounds, 1,2-octanedione, 2-(O-benzoyloxime)-1-[4-(phenylthio)phenyl]-1,2-octanedione, 1-(O-acetyloxime)-1-[9-ethyl-6-(2-methylbenzoyl)-9H-carbazole-3-yl]ethanone, O-ethoxycarbonyl-α-oxyamino-1-phenylpropane-1-one, and the like, and combinations thereof.

Examples of the O-acyloxime compound may include without limitation 1-(4-phenylsulfanylphenyl)-butane-1,2-dione2-oxime-O-benzoate, 1-(4-phenylsulfanylphenyl)-octane-1,2-dione2-oxime-O-benzoate, 1-(4-phenylsulfanylphenyl)-octane-1-oneoxime-O-acetate, 1-(4-phenylsulfanylphenyl)-butane-1-one oxime-O-acetate, and the like, and combinations thereof.

Besides the aforementioned compounds, 2,4,6-trimethylbenzoyl diphenylphosphine oxide, 10-butyl-2-chloroacridone, 2-ethylanthraquinone, benzyl, 9,10-phenanthrenequinone, camphorquinone, methyl phenylglyoxylate, titanocene compounds, and the like, and combinations thereof may also be used.

Further, the photoinitiator may be used together with a photosensitizer causing chemical reaction by transferring energy after excitation by absorbing light.

The photosensitive resin composition may include the photoinitiator in an amount of about 0.1 wt % to about 5 wt %, based on the total weight (total amount, 100 wt %) of the photosensitive resin composition. In some embodiments, the photosensitive resin composition may include the photoinitiator in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the photoinitiator can be in a range from about any of the foregoing amounts to about any other of the foregoing amounts.

When the photosensitive resin composition includes the photoinitiator in an amount within this range, the composition can be sufficiently polymerized in the course of pattern forming, and may not cause any reduction in transmittance due to the residual unreacted initiator after polymerization.

(E) Solvent

The solvent may have compatibility with the acrylic binder resin and other constitutional components without reacting with the components.

Examples of the solvent may include without limitation alcohols, such as methanol, ethanol, and the like; ethers, such as dichloroethyl ether, n-butyl ether, diisoamyl ether, methylphenyl ether, tetrahydrofurane, and the like; glycol ethers, such as ethylene glycol monomethyl ether, ethylene glycol monoethyl ether, and the like; cellosolve acetates, such as methyl cellosolve acetate, ethyl cellosolve acetate, diethyl cellosolve acetate, and the like; carbitol derivatives, such as methylethyl carbitol, diethyl carbitol, diethylene glycol monomethyl ether, diethylene glycol monoethyl ether, diethylene glycol dimethyl ether, diethylene glycol methylethyl ether, diethylene glycol diethyl ether, and the like; propylene glycol alkyl ether acetates, such as propylene glycol methyl ether acetate, propylene glycol propyl ether acetate, and the like; aromatic hydrocarbons, such as toluene, xylene, and the like; ketones, such as methylethylketone, cyclohexanone, 4-hydroxy-4-methyl-2-pentanone, methyl-n-propyl ketone, methyl-n-butylketone, methyl-n-amylketone, 2-heptanone, and the like; saturated aliphatic alkyl monocarboxylates, such as ethyl acetate, n-butyl acetate, isobutyl acetate, and the like; lactates such as methyl lactate, ethyl lactate, and the like; alkyl oxyacetates, such as methyl oxyacetate, ethyl oxyacetate, butyl oxyacetate, and the like; alkyl alkoxyacetates, such as methyl methoxyacetate, ethyl methoxyacetate, butyl methoxyacetate, methyl ethoxyacetate, ethyl ethoxyacetate, and the like; alkyl 3-oxypropionates, such as methyl 3-oxypropionate, ethyl 3-oxypropionate, and the like; alkyl 3-alkoxypropionates, such as methyl 3-methoxypropionate, ethyl 3-methoxypropionate, ethyl 3-ethoxy propionate, methyl 3-ethoxypropionate, and the like; alkyl 2-oxypropionates, such as methyl 2-oxypropionate, ethyl 2-oxypropionate, propyl 2-oxypropionate, and the like; alkyl 2-alkoxypropionates, such as methyl 2-methoxypropionate, ethyl 2-methoxypropionate, methyl 2-ethoxyproionate, and the like; alkyl monooxy monocarboxylates including alkyl 2-oxy-2-methylpropionates, such as methyl 2-oxy-2-methylpropionate and ethyl 2-oxy-2-methylpropionate, and alkyl 2-alkoxy-2-methylpropionate, such as methyl 2-methoxy-2-methylpropionate and ethyl 2-ethoxy-2-methylpropionate; esters, such as ethyl 2-hydroxypropionate, ethyl 2-hydroxy-2-methylpropionate, ethyl hydroxylacetate, and methyl 2-hydroxy-3-methylbutyrate; ketonates, such as ethyl pyruvate; and the like, and combinations thereof. Examples of the solvent may additionally include without limitation high-boiling point solvents, such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetonylacetone, isophorone, capronic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenylcellosolve acetate and the like, and combinations thereof.

Taking into consideration compatibility and reactivity of the solvent, glycol ethers, such as ethylene glycol monoethyl ether; ethylene glycol alkyl ether acetates, such as ethyl cellosolve acetate; esters, such as ethyl 2-hydroxy propionate; diethylene glycols, such as diethylene glycol monomethyl ether; and/or propylene glycol alkyl ether acetates, such as propylene glycol methyl ether acetate, and propylene glycol propyl ether acetate may be utilized. Taking into consideration solubility of the dye, cyclohexanone may be present in an amount of about 10 wt % to about 80 wt %, based on the total amount of solvent.

The photosensitive resin composition may include the solvent in a balance amount, based on the total amount (total weight, 100 wt %) of the photosensitive resin composition such that solubility and viscosity of the composition can be suitably adjusted after addition of other components, and such that physical and optical properties can be enhanced upon application to products.

(F) Other Additive(s)

Optionally, the photosensitive resin composition may further include one or more additives. Examples of the additives may include without limitation nonionic, anionic and/or cationic dispersants to improve dispersibility of dyes and pigments.

Examples of the dispersant may include without limitation polyalkylene glycol and esters thereof, polyoxyalkylene, polyhydric alcohol ester alkylene oxide adducts, alcohol alkylene oxide adducts, sulfonic acid esters, sulfonates, carboxylic acid esters, carboxylates, carboxylic acid salts, alkylamide alkylene oxide adducts, alkylamines, and the like, and combinations thereof.

The dispersant may be present in an amount of about 0.1 wt % to about 4 wt % based on the total weight of the photosensitive resin composition.

Optionally, the photosensitive resin composition may further include a coating improver, such as a silicone coating improver and/or a fluorine coating improver, to enhance coatability and anti-foaming properties, and/or an adhesion promoter and the like to enhance adhesion to a substrate.

The coating improver and/or the adhesion promoter may be present in an amount of about 0.01 wt % to about 1 wt % based on the total weight of the photosensitive resin composition.

The composition may further include one or more other additives, such as but not limited to epoxy compounds; malonic acid; 3-amino-1,2-propanediol; silane coupling agents having a vinyl group or a (meth)acryloxy group; leveling agents; silicone surfactants; fluorine surfactants; radical polymerization initiators, and the like in order to prevent spots or specks upon coating and/or to prevent generation of residues due to leveling property or non-development. The amount of additives used may be easily adjusted depending on desired properties of the composition.

Examples of the epoxy compound may include without limitation phenol novolac epoxy resins, tetramethyl biphenyl epoxy resins, bisphenol A type epoxy resins, alicyclic epoxy resins, ortho-cresol novolac resins, and the like, and combinations thereof. The epoxy compound may be present in an amount of about 0.01 wt % to about 10 wt % based on the total weight of the photosensitive resin composition. Within this range, the composition can exhibit excellent storage properties and process margin.

Examples of the silane coupling agent may include without limitation vinyltrimethoxysilane, vinyltris(2-methoxyethoxysilane), 3-glysidoxypropyltrimethoxysilane, 2-(3,4-epoxy cyclohexyl)ethyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, and the like, and combinations thereof.

The silane coupling agent may be present in an amount of about 0.01 wt % to about 2 wt % based on the total weight of the photosensitive resin composition. Within this range, the composition can exhibit excellent properties in terms of adhesion, storage stability, and coating capabilities.

Examples of the silicone surfactant may include without limitation surfactants having siloxane bonding. For example, commercially available silicone surfactants may include without limitation DC3PA, SH7PA, DC11PA, SH21PA, SH28PA, 29SHPA, and/or SH30PA (Toray Silicone Co., Ltd.); SH8400 (Toray Silicone Co., Ltd.), which is a polyester modified silicone oil; Shin-Etsu Silicone KP321, KP322, KP323, KP324, KP326, KP340, and/or GF (Shin-Etsu Chemical Co., Ltd.); TSF4445, TSF4446, TSF4452, and/or TSF4460 (Toshiba Silicone Co., Ltd.), and the like, and combinations thereof.

Examples of the fluorine surfactant may include without limitation surfactants having a fluorocarbon chain. For example, commercially available fluorine surfactants may include without limitation Fluorad FC430 and/or Fluorad FC431 (Sumitomo 3M Ltd.); MEGAFACE F142D, MEGAFACE F171, MEGAFACE F172, MEGAFACE F173, MEGAFACE F177, MEGAFACE F183, MEGAFACE F470, MEGAFACE F475, and/or MEGAFACE R30 (Dainippon Ink and Chemicals, Inc.); Efftop EF301, Efftop EF303, Efftop EF351, and/or Efftop EF352 (Shinakida Kasei Co., Ltd.); Saffron S381, Saffron S382, Saffron SC101, and/or Saffron SC105 (Asahi Glass Co., Ltd.); E5844 (Daikin Fine Chemical Laboratory Co., Ltd.), and the like, and combinations thereof.

Such silicone surfactants and/or fluorine surfactants may be used alone or in combination of two or more thereof.

A color filter according to another embodiment may be prepared using the photosensitive resin composition according to the present invention.

For example, the photosensitive resin composition can be coated to a thickness of about 1.5 μm to about 3.5 μm onto a glass substrate to which nothing is applied and/or onto a glass substrate on which SiNx (protective layer) is applied to a thickness of about 500 Å to about 1,500 Å by a suitable method, such as spin coating, slit coating, and the like. After coating, the composition can be subjected to soft-baking at about 90° C., followed by irradiating active radiation so to form a pattern for color filters. As a light source for irradiation, for example, UV light in the range of about 190 nm to about 450 nm, for example about 200 nm to about 400 nm, can be used. Electron beams and X-ray irradiation may also be used. After irradiation, the coated layer can be treated with an alkali developing solution to dissolve the non-irradiated area of the coated layer, thereby forming a pattern for color filters. The above procedure may be repeated in accordance with number of desired colors, thereby obtaining a color filter having a desired pattern.

Now, the present invention will be described in more detail with reference to the following examples. However, it should be noted that these examples are provided for illustration only and are not to be construed in any way as limiting the present invention.

Preparative Example 1

To a 100 ml flask, 3.0 g of 5-(dibutylamino)thiophene-2-carbaldehyde, 2.59 g of 1-butyl-6-hydroxy-4-methyl-2-oxo- 1,2-dihydropyridine-3-carbonitrile and 10 ml of acetic anhydride are added, followed by heating while refluxing. After completion of the reaction, the resulting material is cooled and the solvent is removed to obtain (E)-1-butyl-5-((5-(dibutylamino)thiophen-2-yl)methylene)-4-methyl-2,6-dioxo-1,2,5,6-tetrahydropyridine-3-carbonitrile in solid phase.

To a 100 ml flask, 50 mL of dichloromethane are added to dissolve 2.0 g of the obtained solid, that is, (E)-1-butyl-5-((5-(dibutylamino)thiophen-2-yl)methylene)-4-methyl-2,6-dioxo-1,2,5,6-tetrahydropyridine-3-carbonitrile, followed by adding 0.92 g of n-bromosuccinimide and stirring. After completion of reaction, extraction is performed several times using water and the solvent is removed, followed by purification through column chromatography. The resulting solid is filtered and dried under vacuum to obtain a compound represented by Formula 2.

[Formula 2]

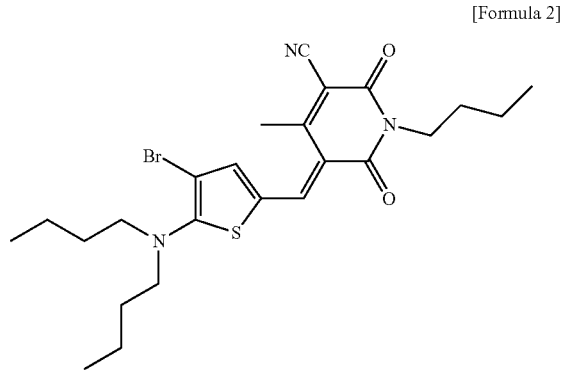 [SMILES: CCCCN1C(=O)C(C#N)=C(C)/C(=C\c2cc(Br)c(N(CCCC)CCCC)s2)C1=O]

Preparative Example 2

A compound represented by Formula 3 is obtained in the same manner as in Preparative Example 1 except that 3.0 g of 5-(dibutylamino)thiophene-2-carbaldehyde and 3.29 g of 1-(2-ethylhexyl)-6-hydroxy-4-methyl-2-oxo-1,2-dihydropyridine-3-carbonitrile are used as reactants.

[Formula 3]

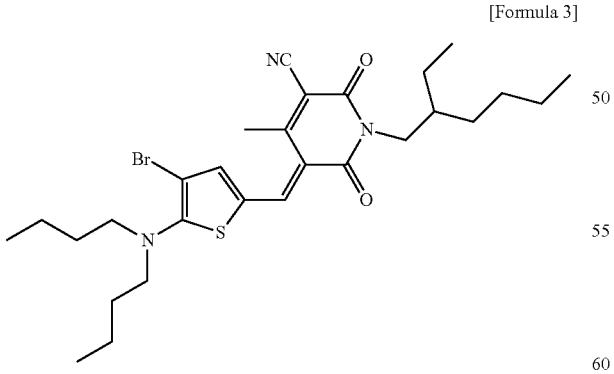

Preparative Example 3

A compound represented by Formula 4 is obtained in the same manner as in Preparative Example 1 except that 3.0 g of 5-(dibutylamino)thiophene-2-carbaldehyde and 2.66 g of 1-(2-ethylhexyl)-6-hydroxy-4-methyl-2-oxo-1,2-dihydropyridine-3-carbonitrile are used as reactants.

[Formula 4]

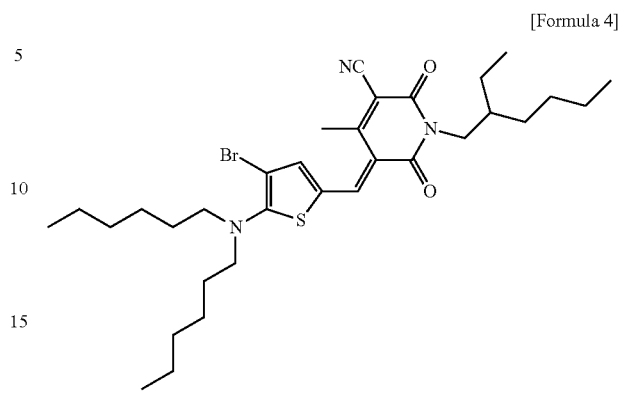

Preparative Example 4

A compound represented by Formula 5 is obtained in the same manner as in Preparative Example 1 except that 3.0 g of 5-(piperidin-1-yl)thiophene-2-carbaldehyde and 4.03 g of 1-(2-ethylhexyl)-6-hydroxy-4-methyl-2-oxo-1,2-dihydropyridine-3-carbonitrile are used as reactants.

[Formula 5]

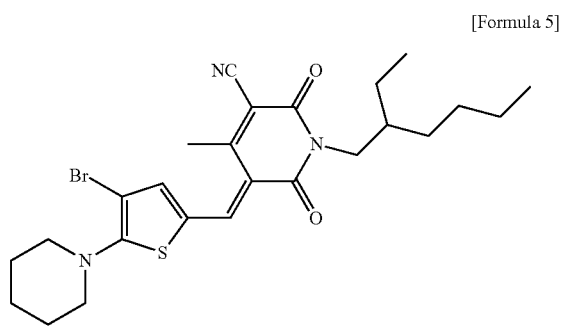 [SMILES: CCCCC(CC)CN1C(=O)C(C#N)=C(C)/C(=C\c2cc(Br)c(N3CCCCC3)s2)C1=O]

Preparative Example 5

A compound represented by Formula 6 is obtained in the same manner as in Preparative Example 1 except that 3.0 g of 5-(dihexylamino)thiophene-2-carbaldehyde and 2.40 g of 2-(3-cyano-6-hydroxy-4-methyl-2-oxopyridin-1(2H)-yl) ethyl acetate are used as reactants.

[Formula 6]

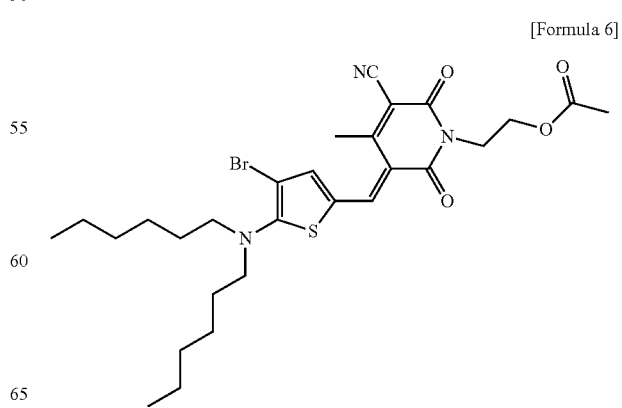

Preparative Example 6

To a 100 ml flask, 3.0 g of 5-(dibutylamino)thiophene-2-carbaldehyde, 2.59 g of 1-butyl-6-hydroxy-4-methyl-2-oxo-1,2-dihydropyridine-3-carbonitrile and 10 ml of acetic anhydride are added, followed by heating while refluxing. After completion of the reaction, the resulting material is cooled and the solvent is removed to obtain (E)-1-butyl-5-((5-(dibutylamino)thiophen-2-yl)methylene)-4-methyl-2,6-dioxo-1,2,5,6-tetrahydropyridine-3-carbonitrile in solid phase.

To a 100 ml flask, 50 mL of dichloromethane are added to dissolve 2.0 g of the obtained solid, that is, (E)-1-butyl-5-((5-(dibutylamino)thiophen-2-yl)methylene)-4-methyl-2,6-dioxo-1,2,5,6-tetrahydropyridine-3-carbonitrile, followed by adding 0.69 g of n-chlorosuccinimide and stirring. After completion of the reaction, extraction is performed several times using water and the solvent is removed, followed by purification through column chromatography. The resulting solid is filtered and dried under vacuum to obtain a compound represented by Formula 7.

[Formula 7]

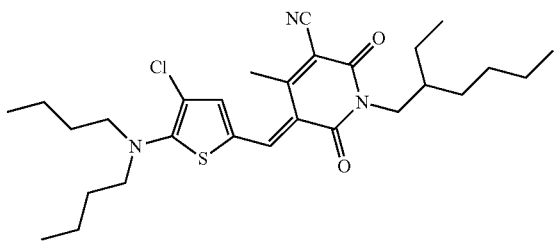

Preparative Example 7

A compound represented by Formula 8 is obtained in the same manner as in Preparative Example 6 except that 3.0 g of 5-(dihexylamino)thiophene-2-carbaldehyde and 2.66 g of 1-(2-ethylhexyl)-6-hydroxy-4-methyl-2-oxo-1,2-dihydropyridine-3-carbonitrile are used as reactants.

[Formula 8]

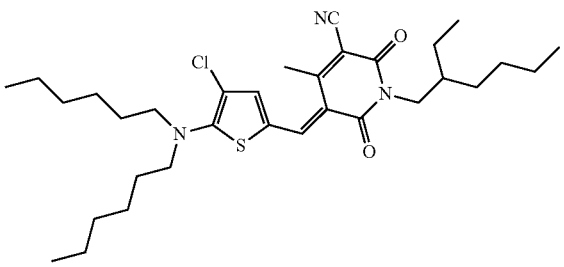

Examples 1 to 7 and Comparative Example 1

Preparation of Photosensitive Resin Composition

Photosensitive resin compositions are prepared by mixing components in a composition as listed in Table 1. Details of the components used in Examples and Comparative Examples are as follows.

(A) Colorant (a1) A compound represented by Formula 2 prepared in Preparative Example 1 is used.

(a2) A compound represented by Formula 3 prepared in Preparative Example 2 is used.

(a3) A compound represented by Formula 4 prepared in Preparative Example 3 is used.

(a4) A compound represented by Formula 5 prepared in Preparative Example 4 is used.

(a5) A compound represented by Formula 6 prepared in Preparative Example 5 is used.

(a6) A compound represented by Formula 7 prepared in Preparative Example 6 is used.

(a7) A compound represented by Formula 8 prepared in Preparative Example 7 is used.

(b) Pigment (b1) A pigment dispersion containing 15 wt % of YELLOW 2GLN (BASF Co., Ltd), 7 wt % of a dispersant Disbyk-163 (BYK Co., Ltd), and 6 wt % of a binder resin CPR-200H (SMS Co., Ltd) is used.

(b2) A pigment dispersion containing 2.94 wt % of C.I. Pigment Red 254, 1.96 wt % of C.I. Pigment Red 177, 3.9 wt % of C.I. Pigment Yellow 150, 4 wt % of a dispersant Disbyk-16 (BYK Co., Ltd), and 3 wt % of a binder resin CPR-200H (SMS Co., Ltd) is used.

(B) Acrylic Binder Resin

A methacrylic acid/benzyl methacrylate copolymer (weight ratio 3:7, MW: 28,000) is used.

(C) Photopolymerizable Compound

Dipentaerythritol hexa(meth)acrylate (Nippon Kayaku Co., Ltd.) is used.

(D) Photoinitiator 1,2-octadione-1-(4-phenylthio)phenyl-2-(o-benzoyloxime) (CGI-124, Ciba Specialty Chemicals Inc.) is used.

(E) Solvent

Propylene glycol methylether acetate is used.

(F) Surfactant

A fluorine surfactant F-554 (DIC) is used.

TABLE 1

|   |   | Example 1 | Example 2 | Example 3 | Example 4 | Example 5 | Example 6 | Example 7 | Comparative Example 1 |
|---|---|---|---|---|---|---|---|---|---|
| (A) Colorant | (a1) | 3.0 | — | — | — | — | — | — | — |
|  | (a2) | — | 3.0 | — | — | — | — | — | — |
|  | (a3) | — | — | 3.0 | — | — | — | — | — |
|  | (a4) | — | — | — | 3.0 | — | — | — | — |
|  | (a5) | — | — | — | — | 3.0 | — | — | — |

TABLE 1-continued

|  | Example 1 | Example 2 | Example 3 | Example 4 | Example 5 | Example 6 | Example 7 | Comparative Example 1 |
|---|---|---|---|---|---|---|---|---|
| (a6) | — | — | — | — | — | 3.0 | — | — |
| (a7) | — | — | — | — | — | — | 3.0 | — |
| (b1) | 2.0 | 2.0 | 2.0 | 2.0 | 2.0 | 2.0 | 2.0 | — |
| (b2) | — | — | — | — | — | — | — | 37.7 |
| (B) Acrylic binder resin | 15 | 15 | 15 | 15 | 15 | 15 | 15 | 5 |
| (C) Photopolymerizable compound | 20 | 20 | 20 | 20 | 20 | 20 | 20 | 10 |
| (D) Photoinitiator | 2 | 2 | 2 | 2 | 2 | 2 | 2 | 2 |
| (E) Solvent | 57.5 | 57.5 | 57.5 | 57.5 | 57.5 | 57.5 | 57.5 | 44.8 |
| (F) Surfactant | 0.5 | 0.5 | 0.5 | 0.5 | 0.5 | 0.5 | 0.5 | 0.5 |

(Unit: wt %)

Preparation of Color Specimen of the Photosensitive Resin Composition

The photosensitive resin compositions prepared in Examples 1 to 7 and Comparative Example 1 are coated to a thickness of 1 μm to 3 μm onto a glass substrate having a size of 10×10 cm$^2$ by spin coating at 300 RPM, 400 RPM or 500 RPM, followed by pre-baking at 90° C. for 2 minutes. After cooling at room temperature for 1 minute, the coating is irradiated at 100 mJ/cm$^2$ (at a wavelength of 365 nm) to form thin films. After irradiation, the thin films are subjected to hard baking in a hot air dryer at 200° C. for 5 minutes to obtain cured thin films.

Evaluation of Physical Properties of the Photosensitive Resin Compositions (1) Measurement of Color and Brightness Spectroscopy is performed on the cured thin films on the glass substrate using a colorimeter MCPD 3000 (Otsuka Electronics Co., Ltd.) to obtain x and y color coordinates (Bx, By) and brightness (Y). Results obtained at target Bx=0.657 are shown in Table 2.

(2) Measurement of Contrast

Contrast of the cured thin films prepared as above is measured using a contrast tester (30,000:1, Tsubosaka Electric Co., Ltd.). Results are shown in Table 2.

TABLE 2

|  | Color coordinates | | Brightness | |
|---|---|---|---|---|
|  | x | y | Y | Contrast |
| Example 1 | 0.657 | 0.325 | 19.23 | 11,300 |
| Example 2 | 0.657 | 0.326 | 19.31 | 11,900 |
| Example 3 | 0.657 | 0.327 | 19.45 | 12,100 |
| Example 4 | 0.657 | 0.326 | 19.29 | 11,900 |
| Example 5 | 0.657 | 0.324 | 19.41 | 11,500 |
| Example 6 | 0.657 | 0.325 | 19.43 | 11,700 |
| Example 7 | 0.657 | 0.326 | 19.39 | 11,600 |
| Comparative Example 1 | 0.657 | 0.327 | 18.51 | 10,500 |

As shown in Table 2, it can be seen that the color filters prepared using the photosensitive resin composition of Examples 1 to 7 wherein the compound represented by Formula 1 is used exhibit better brightness and contrast than those of the color filters in Comparative Example 1 wherein only a pigment dispersion is used.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A compound represented by Formula 1:

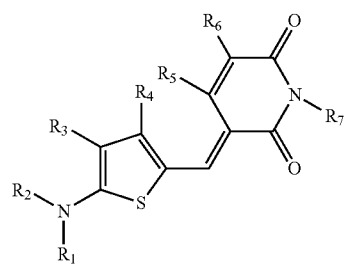

[Formula 1]

wherein $R_1$ and $R_2$ are the same or different and are each independently hydrogen or substituted or unsubstituted $C_1$ to $C_{10}$ alkyl; $R_3$ and $R_4$ are the same or different and are each independently hydrogen, halogen, or substituted or unsubstituted $C_1$ to $C_3$ alkyl; $R_5$ and $R_6$ are the same or different and are each independently hydrogen, a cyano group, or substituted or unsubstituted $C_1$ to $C_3$ alkyl; and $R_7$ is hydrogen or substituted or unsubstituted $C_1$ to $C_{10}$ alkyl, provided that at least one of $R_3$ and $R_4$ is halogen.

2. A color filter comprising the compound according to claim 1 represented by Formula 1.

3. The compound of claim 1, wherein $R_3$ is halogen.

4. The compound of claim 1, comprising one or more compounds of Formulas 2-8:

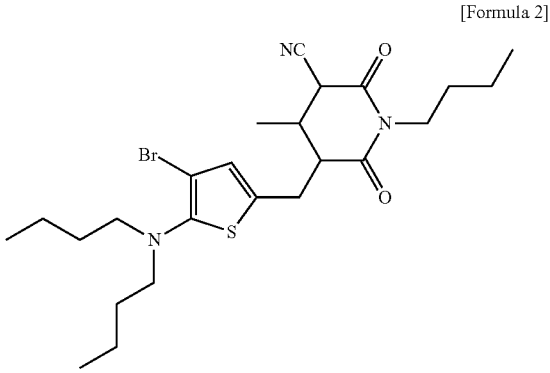

[Formula 2]

[Formula 3]

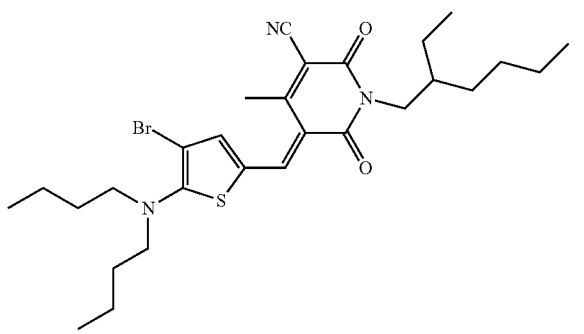

[Formula 4]

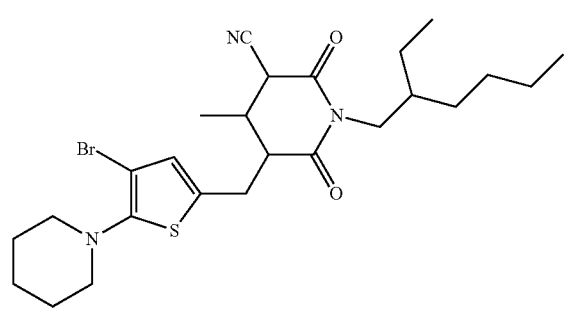

[Formula 5]

[Formula 6]

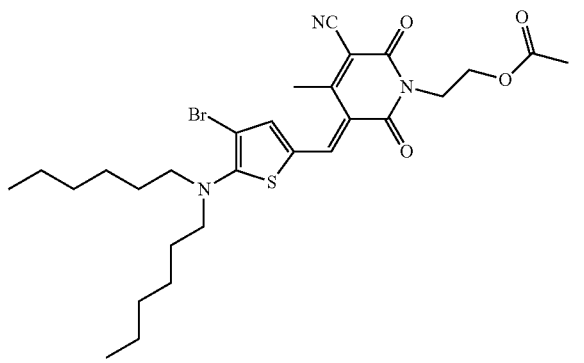

[Formula 7]

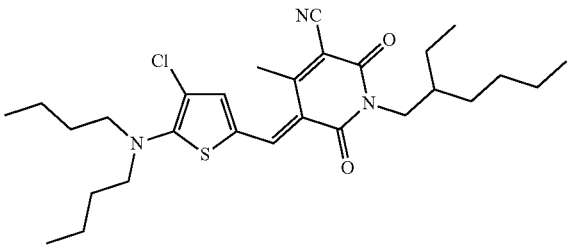

[Formula 8]

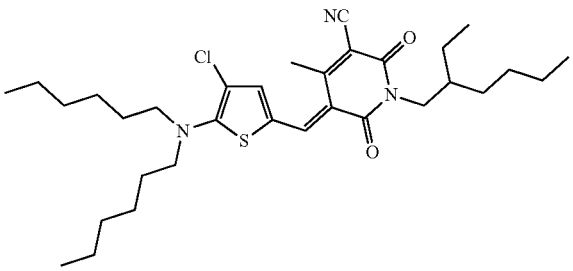

5. A photosensitive resin composition comprising: a colorant comprising a compound represented by Formula 1; an acrylic binder resin; a photopolymerizable compound; a photoinitiator; and a solvent:

[Formula 1]

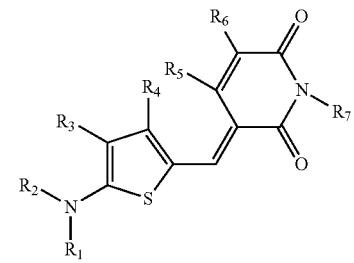

wherein $R_1$ and $R_2$ are the same or different and are each independently hydrogen or substituted or unsubstituted $C_1$ to $C_{10}$ alkyl; $R_3$ and $R_4$ are the same or different and are each independently hydrogen, halogen, or substituted or unsubstituted $C_1$ to $C_3$ alkyl; $R_5$ and $R_6$ are the same or different and are each independently hydrogen, a cyano group, or substituted or unsubstituted $C_1$ to $C_3$ alkyl; and $R_7$ is hydrogen or substituted or unsubstituted C1 to C10 alkyl, provided that at least one of $R_3$ and $R_4$ is halogen.

6. The photosensitive resin composition according to claim 5, comprising: about 1 wt % to about 30 wt % of the colorant; about 1 wt % to about 20 wt % of the acrylic binder resin; about 1 wt % to about 20 wt % of the photopolymerizable compound; about 0.1 wt % to about 5 wt % of the photoinitiator; and a balance amount of the solvent.

7. The photosensitive resin composition according to claim 5, wherein the colorant further comprises at least one pigment comprising a red pigment, a yellow pigment, or a combination thereof.

8. The photosensitive resin composition according to claim 7, wherein the red pigment is C.I. Pigment Red 254, C.I. Pigment Red 255, C.I. Pigment Red 264, C.I. Pigment Red 270, C.I. Pigment Red 272, C.I. Pigment Red 177, or C.I.

Pigment Red 89, and the yellow pigment is C.I. Pigment Yellow 139, C.I. Pigment Yellow 138, C.I. Pigment Yellow 150, or a combination thereof.

9. The photosensitive resin composition according to claim 7, wherein the colorant comprises the compound represented by Formula 1 and the pigment in a weight ratio of about 9:1 to about 1:9.

10. The photosensitive resin composition according to claim 5, wherein the acrylic binder resin is a copolymer of a first ethylenic unsaturated monomer having at least one carboxylic group and a second ethylenic unsaturated monomer copolymerizable with the first ethylenic unsaturated monomer.

11. The photosensitive resin composition according to claim 5, wherein the photopolymerizable compound comprises ethylene glycol diacrylate, triethylene glycol diacrylate, 1,4-butanediol diacrylate, 1,6-hexanediol diacrylate, neopentyl glycol diacrylate, pentaerythritol diacrylate, pentaerythritol triacrylate, dipentaerythritol diacrylate, dipentaerythritol triacrylate, dipentaerythritolpentaacrylate, pentaerythritolhexaacrylate, bisphenol A diacrylate, trimethylolpropane triacrylate, novolac epoxyacrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, or a combination thereof.

12. The photosensitive resin composition according to claim 5, wherein the photoinitiator comprises a triazine compound, acetophenone compound, benzophenone compound, thioxanthone compound, benzoin compound, oxime compound, or a combination thereof.

13. The photosensitive resin composition according to claim 5, further comprising one or more additives selected from the group consisting of dispersants, coating improvers, adhesion promoters, silane coupling agents, leveling agents, surfactants, polymerization initiators, and combinations thereof.

14. The photosensitive resin composition according to claim 5, wherein $R_3$ is halogen.

15. The photosensitive resin composition according to claim 5, wherein the colorant comprising a compound represented by Formula 1 comprises one or more compounds of Formulas 2-8:

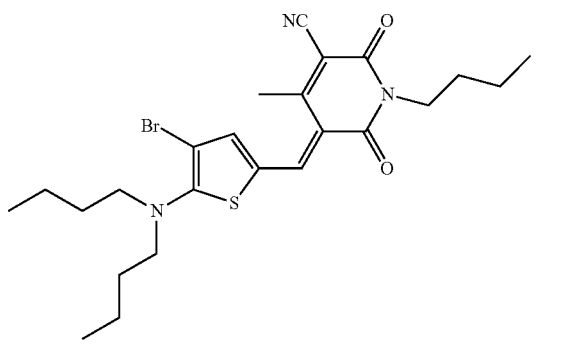

[Formula 2]

-continued

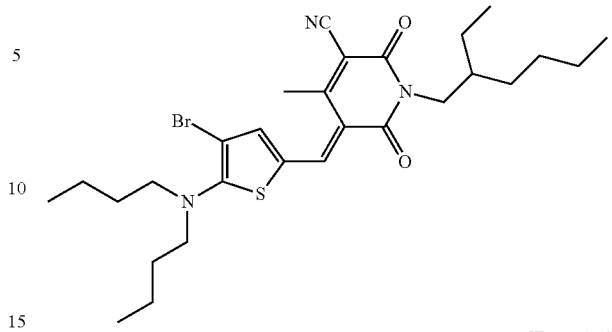

[Formula 3]

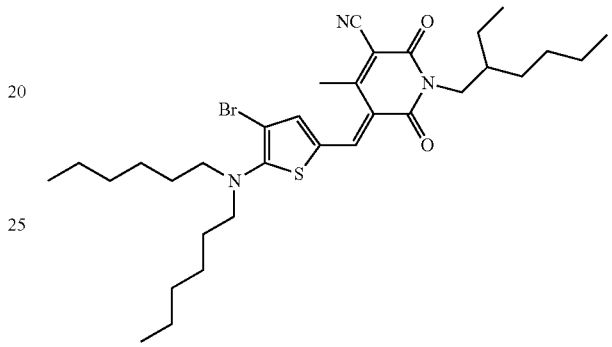

[Formula 4]

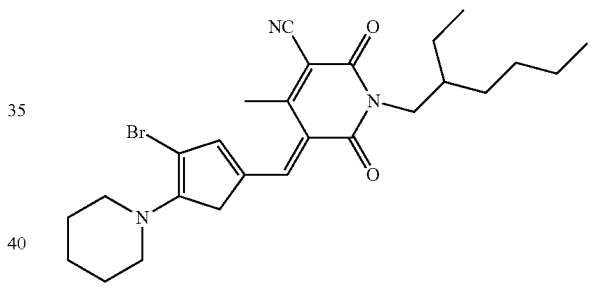

[Formula 5]

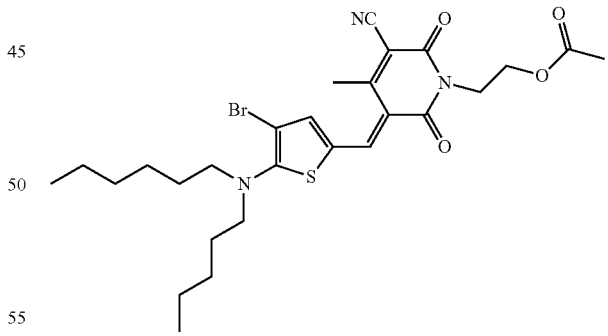

[Formula 6]

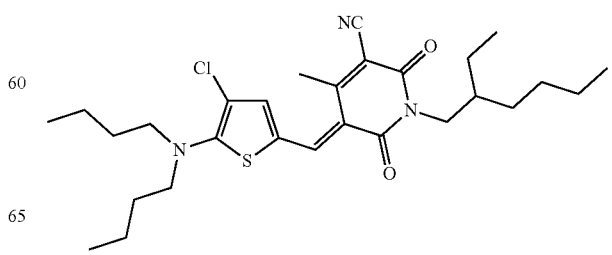

[Formula 7]

-continued
[Formula 8]
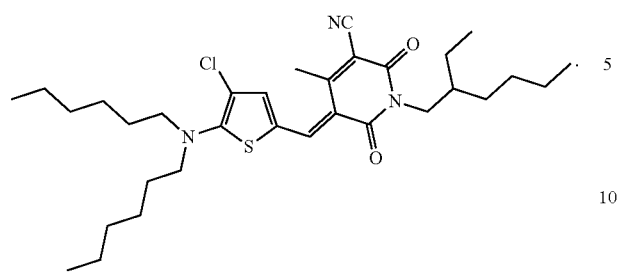
* * * * *

UNITED STATES PATENT AND TRADEMARK OFFICE
CERTIFICATE OF CORRECTION

PATENT NO. : 9,297,940 B2
APPLICATION NO. : 14/307600
DATED : March 29, 2016
INVENTOR(S) : Shin et al.

It is certified that error appears in the above-identified patent and that said Letters Patent is hereby corrected as shown below:

In the Specification

Column 2, Line 40 reads: "substituted or unsubstituted $C_1$ to $C_m$ alkyl, provided that at"
and should read: "substituted or unsubstituted $C_1$ to $C_{10}$ alkyl, provided that at"

In the Claims

Column 19, Claim 4, Formula 5 delete:

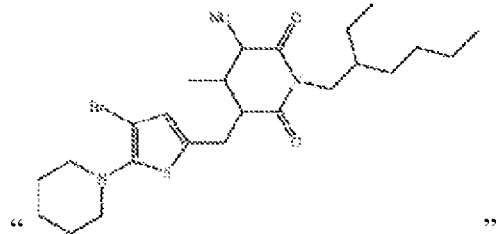

"

and insert:

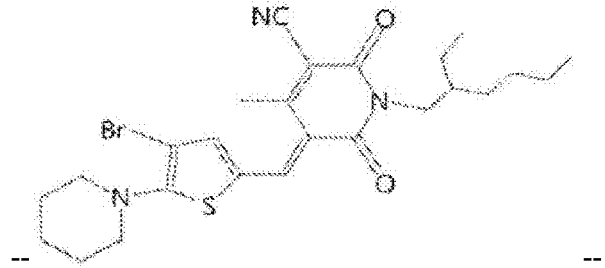

--    --

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,297,940 B2

In the Claims

Column 22, Claim 15, Formula 5 delete:

"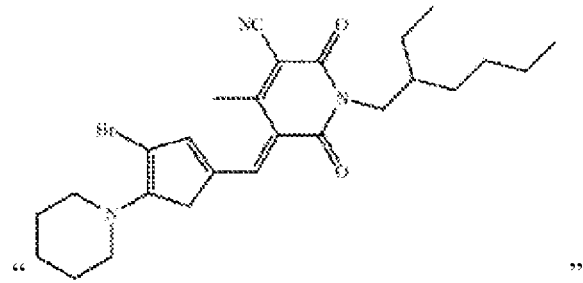"

and insert:

--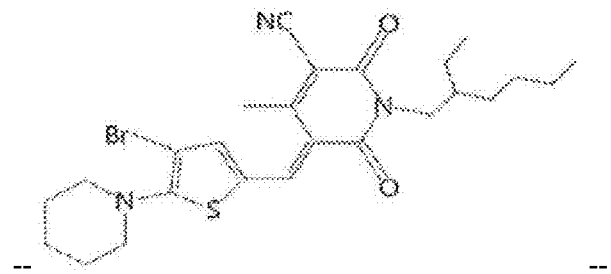--